United States Patent
Pourazin

(10) Patent No.: US 10,360,820 B2
(45) Date of Patent: Jul. 23, 2019

(54) INSTRUMENTATION PRIVACY APPARATUS AND METHOD

(71) Applicant: Shahriar Pourazin, Tehran (IR)

(72) Inventor: Shahriar Pourazin, Tehran (IR)

(*) Notice: Subject to any disclaimer, the term of this patent is extended or adjusted under 35 U.S.C. 154(b) by 12 days.

(21) Appl. No.: 15/256,596

(22) Filed: Sep. 4, 2016

(65) Prior Publication Data

US 2018/0068592 A1  Mar. 8, 2018

(51) Int. Cl.
*G09C 1/00* (2006.01)
*H04L 9/06* (2006.01)

(52) U.S. Cl.
CPC .............. *G09C 1/00* (2013.01); *H04L 9/0637* (2013.01)

(58) Field of Classification Search
CPC ........................................................ G09C 1/00
See application file for complete search history.

(56) References Cited

U.S. PATENT DOCUMENTS

| | | | |
|---|---|---|---|
| 5,323,464 A | 6/1994 | Elander et al. | |
| 6,490,353 B1 | 12/2002 | Tan | |
| 6,922,422 B2 * | 7/2005 | Peters | G02B 6/12004 372/34 |
| 7,426,272 B2 | 9/2008 | Hershey | |
| 7,515,553 B2 | 4/2009 | McDermott et al. | |
| 8,155,306 B2 | 4/2012 | Brickell et al. | |
| 8,155,317 B2 * | 4/2012 | Motoyama | H04L 9/003 380/252 |
| 8,259,934 B2 | 9/2012 | Karroumi et al. | |
| 8,442,221 B2 * | 5/2013 | Ming | G09C 5/00 380/54 |
| 8,712,036 B2 | 4/2014 | Smith et al. | |
| 8,942,371 B2 | 1/2015 | Urbanik et al. | |
| 9,635,011 B1 * | 4/2017 | Wu | H04L 63/0807 |
| 2014/0233735 A1 * | 8/2014 | Zhang | H04L 9/0656 380/270 |

* cited by examiner

*Primary Examiner* — Hee K Song
(74) *Attorney, Agent, or Firm* — Louis Ventre, Jr.

(57) ABSTRACT

An apparatus implements a process to enhance message privacy and includes memory and a processor coupled to the memory. The processor accesses a plain-text message in binary computer code; utilizes a key aligned with a first segment of the plain-text message; utilizes the "one" bits of the key to point to tapped bits in the first segment; removes each tapped bit and places them into a new block; shifts the remaining bits in the first segment rightward (or leftward) and creates a ciphered message by three steps: filling the empty spaces in the message block with the tapped bits; adding the tapped bits as a second block after the first segment; and inserting the tapped bits into a second block of the plain-text message displacing bits located at an end of the second block and then moving those displaced bits into the empty bit spaces in the first segment.

2 Claims, 7 Drawing Sheets

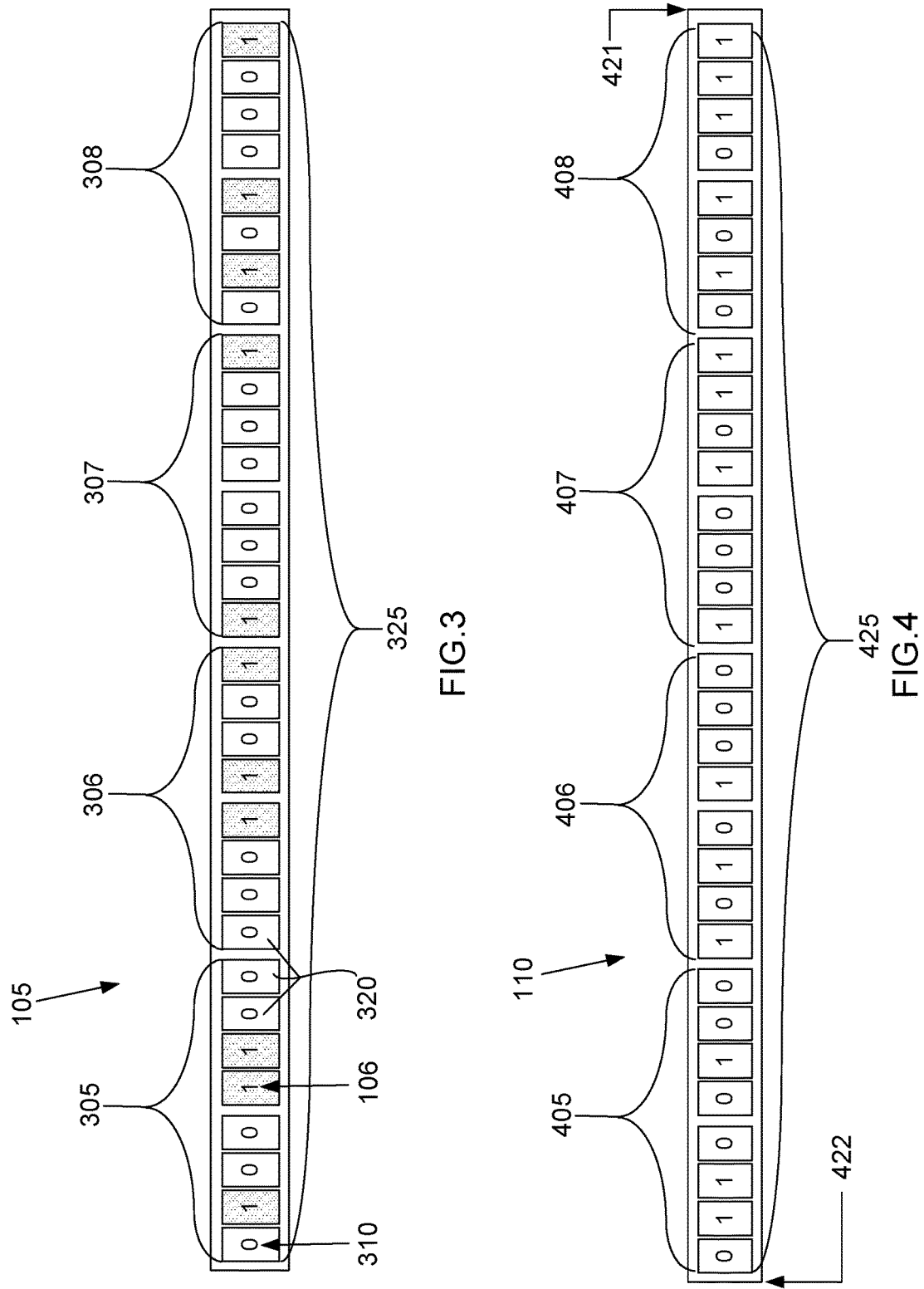

INSTRUMENTATION PRIVACY APPARATUS AND METHOD

TECHNICAL FIELD

In the field of cryptography, equipment and process applicable to data processing systems are used to obscure intelligible information by transforming such information so as to make the information unintelligible to a casual or unauthorized recipient, and to extract intelligible information from such a concealed representation.

BACKGROUND ART

Data encryption systems are important to messaging and other data processing activities in order to preserve privacy in transmission over insecure communication channels. Encryption techniques can be economically important for protecting commercial interests in many fields where encrypting and protecting digital data such as text, audio, and video are transferred over the Internet and via other digital network systems.

Data encryption systems are generally classified in two general categories: symmetric (or secret key) and asymmetric (or public key).

Symmetric systems, like the present invention, use the same secret key for performing the encryption operation and for the decryption operation. A well-known symmetric encryption algorithm is the Data Encryption Algorithm (DEA) that implements the Data Encryption Standard (DES) as defined by the National Institute of Standards and Technology publications "Data Encryption Standard (DES)", FIPS PUB 46-2 (1980) and "DES Modes of Operation", FIOS PUB 81 (1988). The DES encryption system utilizes a 56-bit key plus 8 bits for parity checking and the encryption block size is 64-bits.

In general, existing encryption systems incorporate cumbersome operations that are time consuming and relatively slow. Symmetric encryption systems may be characterized in that they repeatedly perform the same sequence of operations on plaintext input blocks. This technique is referred to as round functions with the algorithms gaining strength by performing the same sequence of operations numerous times.

While there are many methods of symmetric key block encryption systems, the most popular methods (for example, DES, CAST, RC5, and Blowfish) are based on Type-2 Fiestel Networks. This scheme consists of dividing the data to be encrypted into two halves and then executing a number of pre-determined rounds, where each round consists of transforming the left half of the data based on the right half of the data and then transforming the right half based on the transformed left half.

SUMMARY OF INVENTION

An apparatus implements a process to enhance message privacy and includes a non-transitory computer readable medium and a processor coupled to the non-transitory computer readable medium. The processor performs the steps in the process. The processor is configured to access a plain-text message in binary computer code; utilize a key of plain text comprising a block; align a first segment of the plain-text message with the key; utilize the bits of the key that are designated by the number one to point to tapped bits in the first segment of the plain-text message; remove each tapped bit from the first segment of the plain-text message; place each tapped bit into a new block preserving the relative location of each bit; shift the remaining bits in the first segment of the plain-text message rightward or leftward, leaving empty bit spaces on a left-side or the right-side of the first segment; shift the tapped bits into the message in one of three ways: into the empty bit spaces on the left-side or right-side of the first segment; into a second block after the first segment leaving empty spaces on the left side of the first segment; and into a supplemental block at a beginning of a second segment of the plain-text message displacing second right-hand bits located at the right end of the second segment and then moving those displaced bits into the empty bit spaces in the first segment. The process is repeated until all blocks of the message are encrypted.

The processor is optionally configured to create a ciphered-extract key by changing the key with one or more reversible operations, which may include one of the following steps: altering the bytes of the key by setting to one the middle bit of each three consecutive zeros, and setting to zero the middle bit of each three consecutive ones.

The processor is optionally configured to use an extract key to XOR the ciphered first segment.

The process may be altered to shift the remaining bits in the message block within sub-blocks rather than across the entire block. Similarly, the key uses the same sub-blocks so that the tapped bits fit into the empty spaces of the sub-blocks in the message block.

Technical Problem

There is a need for a simple yet effective cryptographic process that is inexpensive in terms of required processing power and memory compared with the more complicated and expensive existing algorithms available today.

There is a need for an encryption process that alters each block of plain text in a manner that is not reversible by simply swapping sub-blocks because such action can be more easily reversed without the key. Such existing encryption methodology has inherent weaknesses with regard to the ability to generate mappings between cipher text and plaintext.

What is needed is a simple, low-power encryption apparatus and method that changes the bit patterns within the data to be transmitted in a way that hides the content from those who sniff the traffic. And also at the same time, the receiver can equally as easily decrypt the data with the key.

What is needed is an apparatus and method that is useful for stream ciphering, block ciphering, and cipher block chaining.

Solution to Problem

The solution is a ciphering apparatus and method that is both reliable and fast in application. The solution utilizes simple but important operations. One is selective bit removal that moves designated bits in a block (or stream) of a plain-text message to a buffer preserving the value and relative location of the removed bits. Another important operation is a block- or sub-block-wide shift that moves the bits toward the least significant bit (rightward) to fill the positions of removed bits in a way that no bits are swapped during shifting. The removed bits in the buffer are shifted leftward (or rightward) to form the pattern that is inserted into the empty bit space created by the rightward shift of the remaining bits in the block (or stream) of a plain-text message. In contrast with complicated and time consuming cryptographic algorithms, the decryption process in this method, is obviously doing the simple operations in reverse effect to reconstruct the plain-text from the cipher-text. Due to the simple nature of the decryption in this method, the decryption details is not described.

Advantageous Effects of Invention

The apparatus and method described herein are directed to improvements in existing computer technology. The improvements include increased flexibility in creating and sending secure messages, faster plain text to encrypted message conversion times, and smaller memory requirements for the encryption process.

The apparatus and method are versatile improvements to computer technology having potential for application to both stream and block ciphering as well as cipher block chaining.

The specific implementation of the invention is a solution to a problem in the software arts providing a fast bitwise operations in a ciphering hardware and method that eliminates the need for hardware of the prior art such as a cryptographic accelerator for encryption or decryption.

The fast and simple operations disclosed herein may be used instead of cumbersome and slower operations in known encryption techniques, such as DES, 3DES, AES in file transfer, VPN configurations like IPSec. And making the keys two times longer, will make the processing about two times slower and the buffers two times longer that shows a linear relation between the complexity of method and the key length. Making huge and long keys with not require too much computing power and this presents the method as being stably fast no matter what the key length is.

Although it is possible to develop a hardware cryptographic accelerator implementing the disclosed methods, the apparatus and method steps disclosed herein requires the same number of instructions that are required to communicate with such accelerator. The disclosed method requires a very small number of CPU cycles compared with other ciphering methods.

The disclosed ciphering method requires low memory in comparison to other methods.

The disclosed ciphering method is ideal for low power consuming devices and as an enabler for Internet of Things (IoT) or Internet of Anything (IoA). The method requires no traditional cryptographic accelerator to let the devices in Internet of Things (IoT) and Internet of Anything (IoA) protect their data. These devices are definitely low power consumption and have low computing power, low amount of memory but require fast communication. The method is also appropriate for Internet Protocol Television (IPTV) channel protection, Voice over Internet Protocol (VOIP) and any video broadcasting or streaming protocol that requires smooth and fast encryption and decryption that causes almost no delay in communication.

The disclosed ciphering method only necessitates storing the position of ones in the key. So, for the example in FIG. 1, only eleven bits exist and 55 bits are enough for storing the key. This is more than the 32 bit-length key shown in FIG. 1, but if only a weak key is needed, for example one with only two bits set, then 10 bits is enough to store the key.

Performing simple operations on the key or the ciphered segments may improve information hiding. As an example, one can use an XOR operation after finishing the bit processing to make the ciphered text more complicated. This could be done with the use of the key itself or by an extract from the key. The extract is computable using the key on both sides of communication.

BRIEF DESCRIPTION OF DRAWINGS

The drawings illustrate preferred embodiments of the instrumentation privacy apparatus and method according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 3 illustrates components of a key in binary code.

FIG. 4 illustrates components of a block and first segment of a plain-text message.

DESCRIPTION OF EMBODIMENTS

Figure 1:
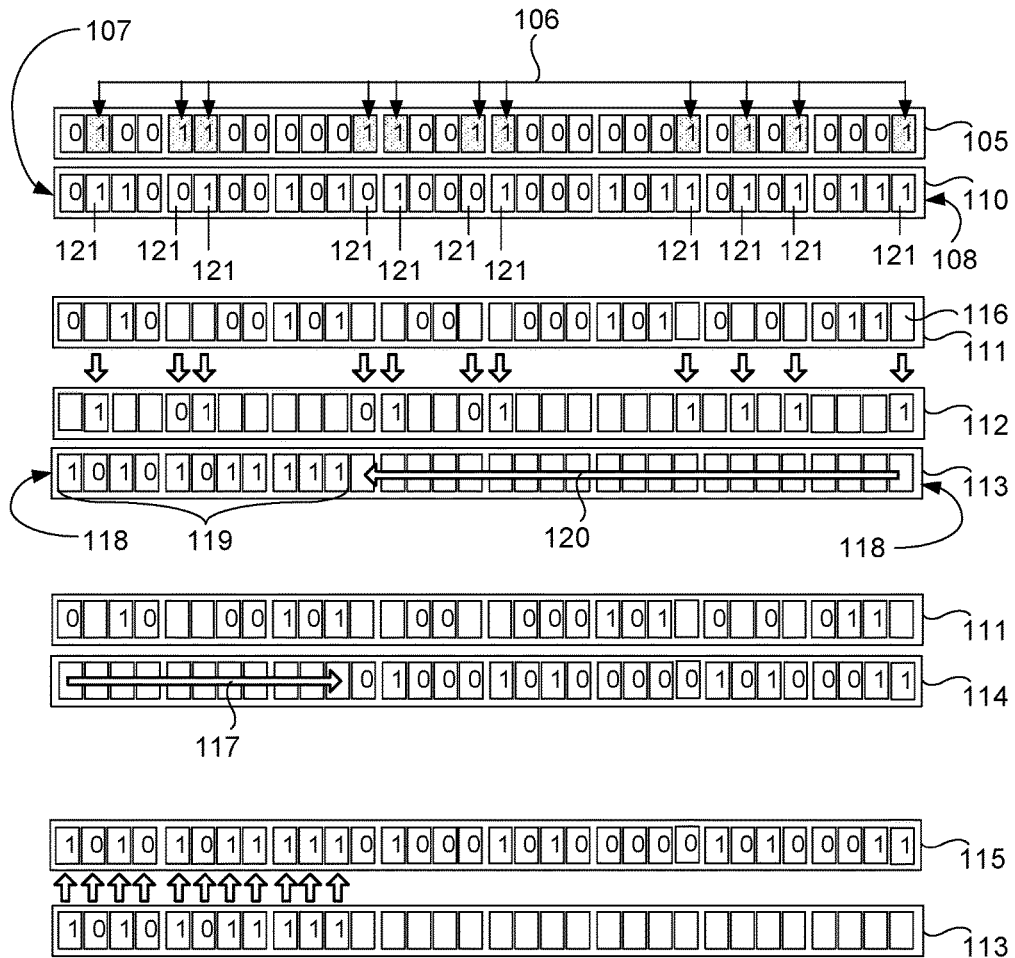
FIG. 1 illustrates operational steps employed on binary code in a first preferred embodiment utilizing a rightward shift for the instrumentation privacy apparatus and method.
Figure 2:
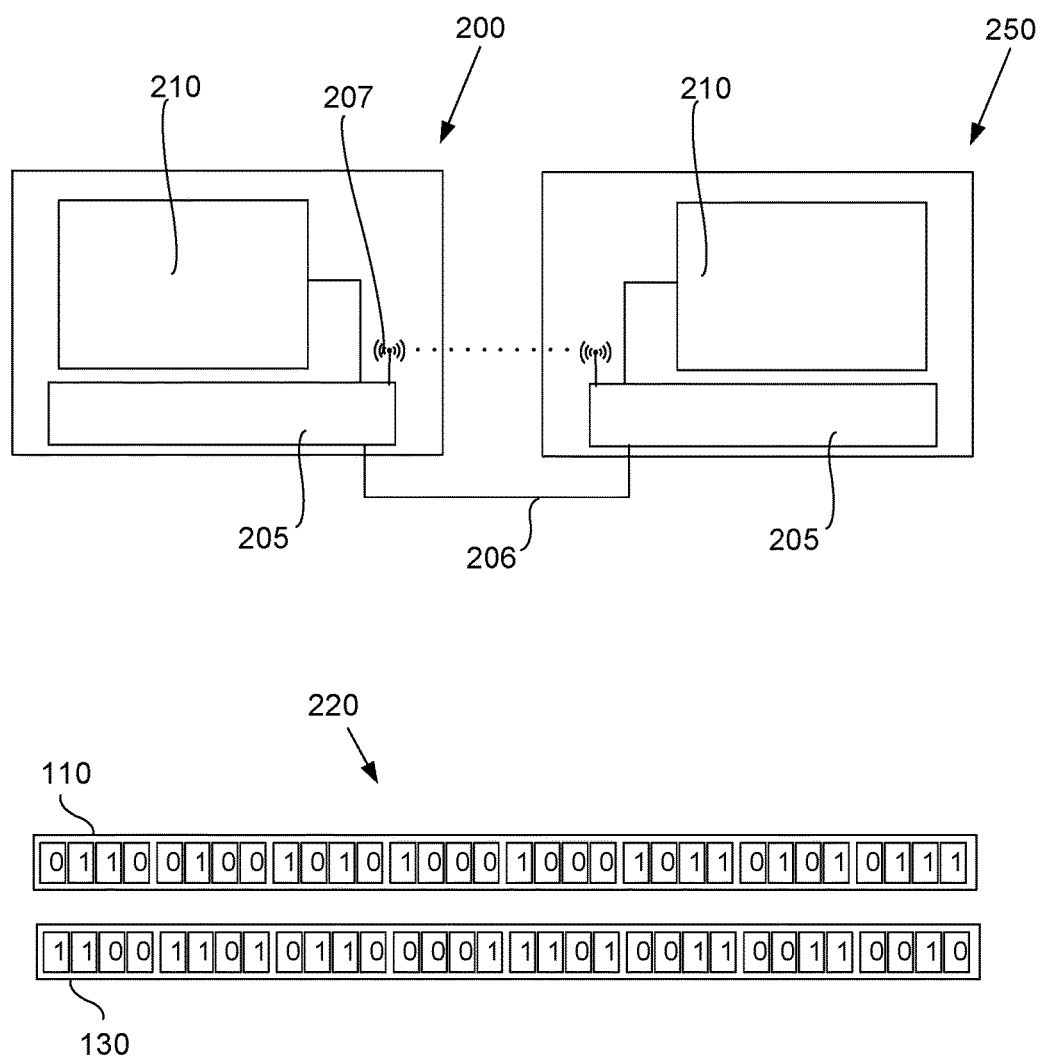
FIG. 2 is a diagram of apparatus components used to operate on a plain-text message shown in binary computer code.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

A first preferred embodiment of the first computing device (200) for message privacy includes a non-transitory computer readable medium (205); and a processor (210) coupled to the non-transitory computer readable medium (205). The first computing device (200) is functional to improve the utility and performance of computer technology in interacting with a second computing device (250) by enabling conveyance by hard wire (206) or wireless (207) transmission of a secure message from the first computing device to the second computing device (250).

The processor (210) is configured to perform an encryption process on a plain-text message (220) that exists in binary computer code, which is the form that virtually all messages take when written on, stored in, or acted upon by a computer, or other electronic text messaging device. This step might be done also on transitory medium (such as computer random access memory) in case of VPN servers (or any other packet switching system on the network such as a router) in which the transmitted packets are encrypted or decrypted by this method on a packet forwarding device.

The method can encrypt (and later decrypt) the stored data on non-transitory medium to protect it from unauthorized access or the method can work on packets to protect the packets from being sniffed or tampered.

The non-transitory computer readable medium (205) (also commonly known as machine readable medium) may be any physical device that that stores computer data and is readable by a computer. The device according to the disclosure herein is functional to encrypt and decrypt on-the fly preferably by manipulating physical memory buffers. For example, on-the-fly encryption and decryption can occur on a Virtual Private Network (VPN) server in which passing data packets are manipulated on the fly. Such physical memory buffers are non-transitory as they are not signals but they are volatile memories according to literature as they will not keep any data in the event of a power cut. Thus, examples of non-transitory computer readable medium (205) include volatile and non-volatile computer memory devices. Examples of volatile and non-volatile computer memory devices include a computer hard drive, random access memory, read only memory, a USB drive, a compact disk, a DVD disk, and other magnetic media such as magnetic disks, cards, tapes, and drums, and optical disks. The non-transitory computer readable medium (205) is not intended to include transitory propagating signals.

The processor (210) is coupled to the non-transitory computer readable medium (205) to read and write data. The processor (210) includes a central processing unit (CPU), which is the electronic circuitry within a computer that carries out the instructions of a computer program by performing the basic arithmetic, logical, control and input/output operations specified by the instructions. The principal components of a processor include the arithmetic logic unit that performs arithmetic and logic operations, processor registers that supply operands to the arithmetic logic unit and store the results of the arithmetic logic unit operations, and a control unit that fetches instructions from memory and "executes" them by directing the coordinated operations of the arithmetic logic unit, registers and other components. The processor (210) may be a microprocessor, meaning the processor (210) is contained on a single integrated circuit chip that also contains memory, peripheral interfaces, and other components of a computer. When so structured, the processor (210) may be referred to as a microcontroller or system on a chip. The processor (210) may comprise a multi-core processor, array processors or vector processors using multiple processors that operate in parallel, with no unit considered central.

In a preferred embodiment, the processor (210) is configured to operate on the plain-text message (220) in order to encrypt it for transmission to a third party, such as via the Internet, or to decrypt it for reading once the transmission is received on a computing device, such as a personal computer or a smart phone. In performing the steps of the process or implementing what it is configured to do, the processor (210) may alter and utilize storage buffers or registers in computer memory, such as random access memory or the non-transitory computer readable medium (205). The first computing device (200) is also preferably operable to transmit a synchronous packet of data to a receiving device, or at least connect to a transmission device for such operability.

The processor (210) is preferably configured to access the plain-text message (220), which is in binary computer code. This plain-text message (220) is, therefore, in a binary code of zeros and ones for the encryption or decryption operations to be performed. Access may be accomplished by reading the plain-text message (220) from the non-transitory computer readable medium (205) or simply by receiving a plain-text message (220) via an input device from a user.

The processor (210) is preferably configured to utilize a key (105) of plain text comprising a block (325). The key (105) may be stored in the non-transitory computer readable medium (205) or generated by the processor (210). The block (325) is divided into a plurality of bytes, one exemplary division of the block (325) is illustrated in FIG. 3 as byte A (305), byte B (306), byte C (307) and byte D (308). Each of these bytes includes a plurality of bits (320) and each bit of the key (105) is a number that is either a zero (310) or a one (106). The plurality of bits (320) within the block (325), that is the total number of bits, is defined as a bit length. In the block (325) there are shown 4 bytes with 8 bits per byte yielding a bit length of 32. Within the key (105), there is a plurality of bits (320) that are ones, that is, the plurality of bits (320) in the key (105) comprises a plurality of ones. A plurality of ones is needed to avoid a weak or easily de-crypted cipher, which results from a weak key. A cipher can be described as having a weak key when the number of ones (or zeros) in the key are too few. In two worst cases, a key with all ones or all zeros will do nothing and only the last XOR operation will change the plain-text The processor (210) is preferably configured to align a first segment (110) of the plain-text message (220) with the key (105). Alignment is figuratively or literally placing one atop the other so that their bits align. In order for this to occur, the first segment (110) is defined by a corresponding block (425), shown in FIG. 4, matching the bit length of the key (105), wherein each bit of the key (105) vertically aligns with each bit in the first segment (110).

The processor (210) is preferably configured to utilize each of the plurality of bits (320) of the key (105) that is the number one (106) to point to a tapped bit (121) in the first segment (110) of the plain-text message (220). There are 11 tapped bits shown in the example of FIG. 3.

The processor (210) is preferably configured to remove each tapped bit (121) from the first segment (110) of the plain-text message (220). Such removal leaves an empty bit space (116) in the block (325) of the first segment (110) of the plain-text message (220) where each tapped bit (121) was removed. Once removed, there are fewer bits in the first segment (110) than when the process began and these fewer bits are the remaining bits. Thus, after removal, the first segment (110) of the plain-text message (220) then comprises remaining bits (111).

The processor (210) is preferably configured to place each tapped bit (121) into a new block (112) at a corresponding bit location within the new block (112), said new block (112) structured similarly to the key (105). This placement maintains the same order of occurrence of each tapped bit (121) in the block (325) as was found in the plain-text message (220) prior to removal of the tapped bits.

The processor (210) is preferably configured to shift the remaining bits (111) in the first segment (110) of the plain-text message (220) rightward (117) (or leftward (817)) so as to eliminate each empty bit space (116) between the remaining bits (111) in the first segment (110) of the plain-text message (220). This rightward (117) (or leftward (817)) movement or shift positions all the remaining bits (111) in the first segment (110), one next to the other from a right-end (421) (or left-end (422)) of the first segment (110), leaving empty bit spaces on a left-side (107) (or right-side (108)) of the first segment (110). So, in the example shown in FIG. 1, a compressed first segment (114) shows 11 empty bit spaces at its left-side (107).

The processor (210) is preferably configured to shift each tapped bit (121) in the new block (112) to an end (118) of the new block (112). The shift may be leftward (120) or rightward (117), creating a compressed new block (113). A leftward (120) shift is shown via example in FIG. 1. This movement or shift also creates an end sequence (119) of removed tapped bits that are one next to the other from one of the ends of the new block (112), which is either the left-end or the right-end of the new block. It will be appreciated by a person of skill in the art that it is irrelevant which direction (leftward or rightward) the tapped bits are moved, as long as their relative order is not changed, the entire group of shifted bits will eventually be inserted into the empty bit spaces of a compressed first segment (114) and so which way the tapped bits are shifted is not an important variation.

The processor (210) is preferably configured to create a ciphered first segment (115) by inserting the end sequence (119) of the new block (112) into one of three locations in the first segment. Thus, the compressed tapped bits are moved to a location in the plain-text message (220) selected from the group consisting of one of these three locations.

Figure 8:
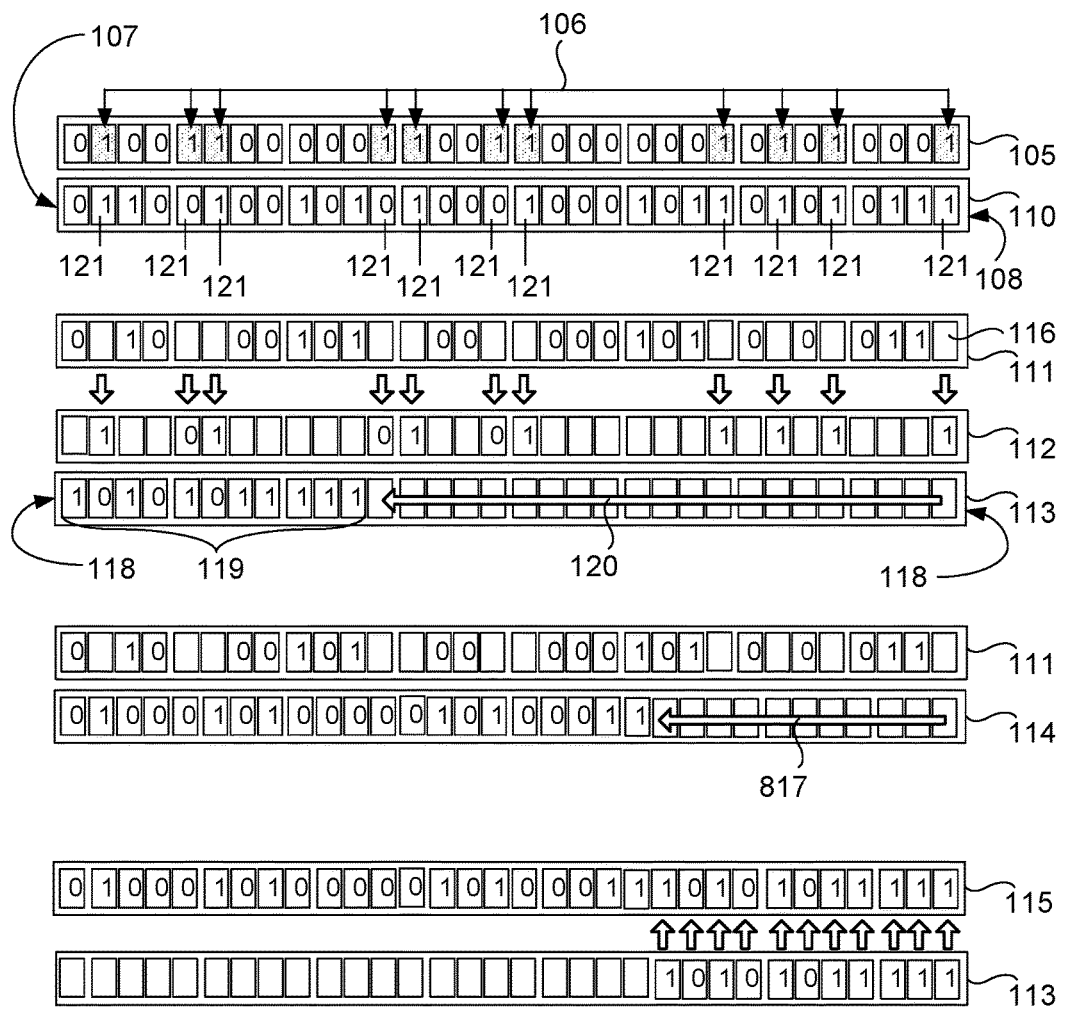
FIG. 8 illustrates operational steps employed on binary code in an alternate embodiment utilizing a leftward shift for the instrumentation privacy apparatus and method.

The first such location is the left-side (107) (or right-side (108)) when we shifted the remaining bits rightward (117) (or leftward (817)) of the first segment (110) filling the empty bit spaces of the first segment (110) of the plain-text message (220). In the exemplar shown in FIG. 1, illustrating the rightward (117) shift, there were 11 empty bit spaces created by removal of the tapped bits and once compressed or shifted left these fit precisely into each empty bit space (116) at the beginning of the compressed first segment (114), as shown. Similarly, in the exemplar shown in FIG. 8, illustrating the leftward (817) shift, there were 11 empty bit spaces created by removal of the tapped bits and once compressed or shifted right these fit precisely into each empty bit space (116) at the end of the compressed first segment (114), as shown.

Figure 5:
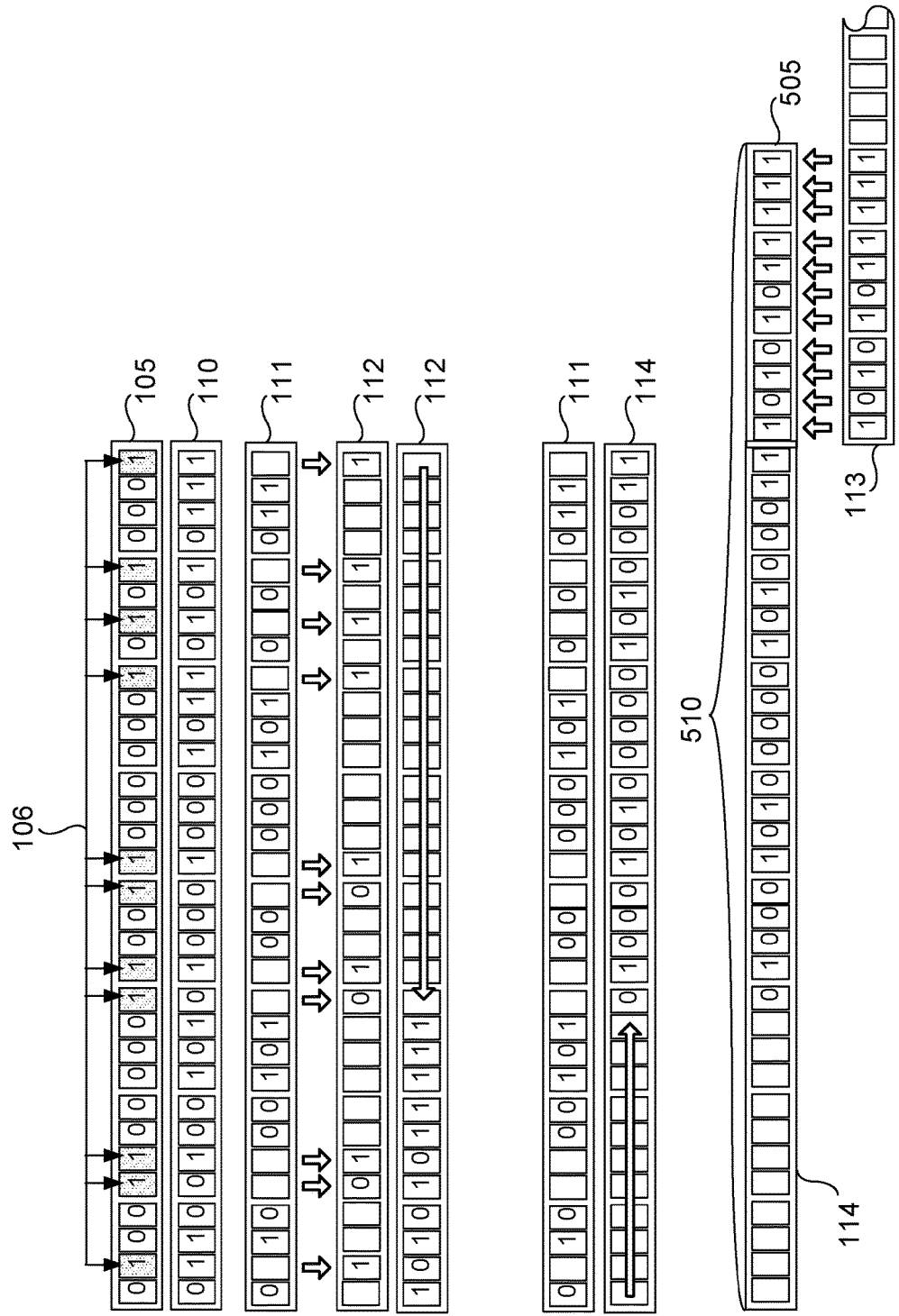
FIG. 5 illustrates operational steps employed on binary code in a second preferred embodiment of the instrumentation privacy apparatus and method.

The second such location is in a second block (505), shown in FIG. 5, after the right-end (421) of the first segment (110) of the plain-text message (220) thereby creating an augmented first segment (510). The augmented first segment (510), shown in FIG. 5, is then appended by 11 bits. As is shown, there are 11 empty bit spaces at the left-side of the augmented first segment (510).

Figure 6:
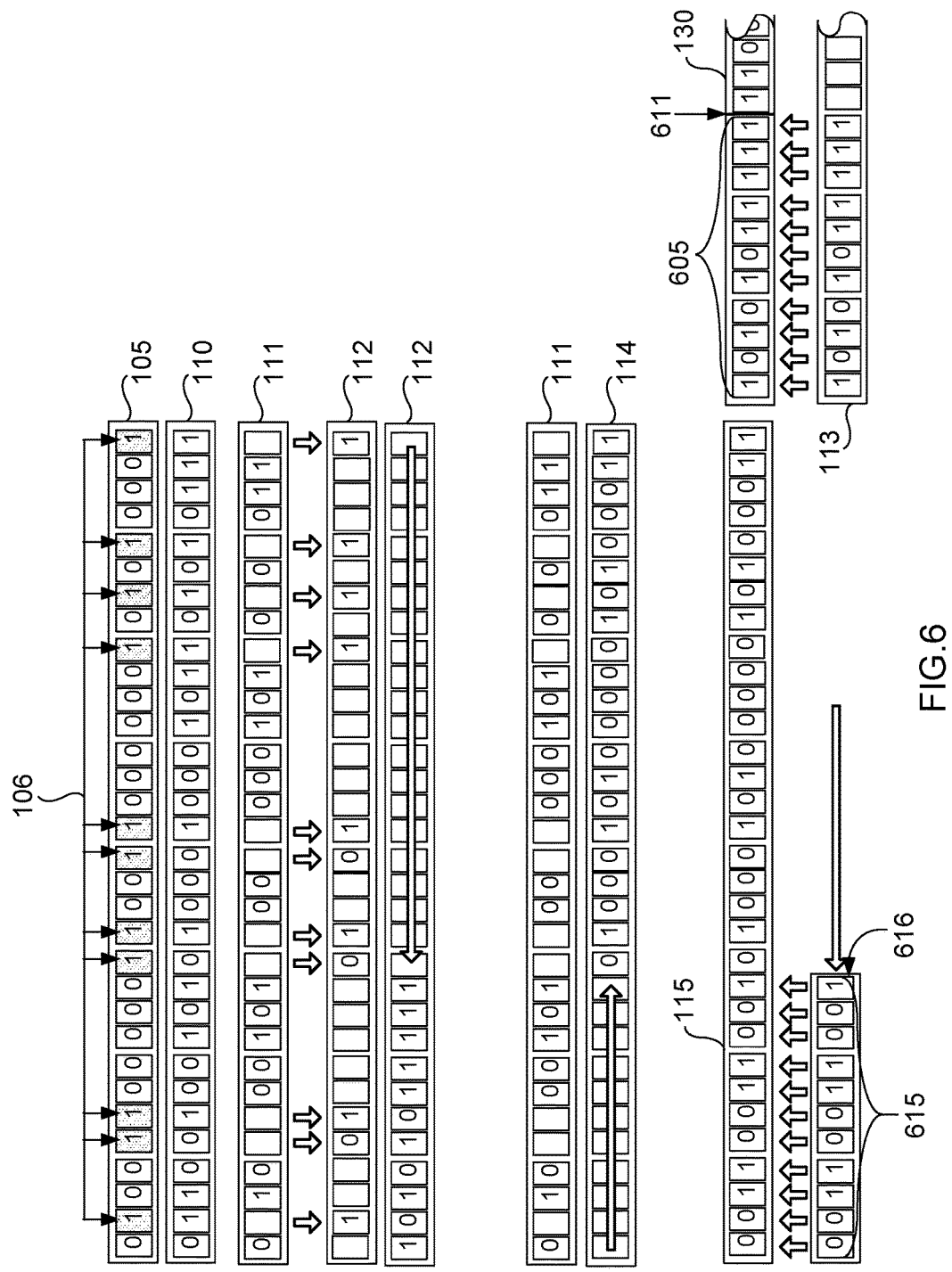
FIG. 6 illustrates operational steps employed on binary code in a third preferred embodiment of the instrumentation privacy apparatus and method.

The third such location, shown in FIG. 6, is in a supplemental block (605) at a beginning (611) of a second segment (610) of the plain-text message (220), displacing an equal number of second right-hand bits located at a right block-end (616) of the second segment (610). These second right-hand bits displaced are then moved or relocated, preferably in the same relative order, to the left-side (107) of the first segment (110), filling the empty bit spaces of the first segment (110) of the plain-text message (220).

After the ciphered first segment (115) has been created, the first computing device (200) sends at least the ciphered first segment to the second computing device (250). As with all the embodiments, sending may be accomplished by a hard wire (206) connection or a wireless (207) connection to the second computing device.

Example of Block Ciphering

An example of block ciphering is explained with reference to FIG. 1 and FIG. 4. This example shows the mechanism of encryption that acts in an environment consisting of a key (105) and a corresponding block (425) of plain text. The corresponding block (425) includes a corresponding plurality of bytes, shown as corresponding byte A (405), corresponding byte B (406), corresponding byte C (407) and corresponding byte D (408).

The key (105) has the same bit length of the corresponding block (425). The bits of number one (106) in the key (105) select the position of bits (tapped bits) that should be withdrawn from the corresponding block (425) of plain text. Each tapped bit (121) is moved to a buffer without changing their relative order with respect to each other. The remaining bits (111) in the corresponding block (425) of plain text are shifted to the right to the end of the corresponding block (425), i.e. shifted block-wide. By block-wide, it is meant that the least significant bit (LSB) of any high-order byte in the block will become the most significant bit (MSB) of its next (right) low-order byte, so the shifting occurs over the boundaries of bytes. The shifting of bits continues until all bits are moved to the right of the corresponding block (425) of plain text and all the positions of omitted bits are covered by their left-side bit. At the end of the block-wide shift, some high order bytes of block become empty. One right hand side byte in empty bytes might still have some bits of block. This byte has some high order bits of the shifted block.

In summarizing this example, the key (105) has the same bit length as the corresponding block (425). After aligning the key and the plain text, the selected bits are moved to a buffer, whereupon a block-wide shift occurs in compressing the bits. Then the cipher text is created by moving the tapped bits back to the corresponding block (425) in the new positions. This process is repeated for all of the blocks in the plain-text message.

Deciphering

The ciphered message may be de-coded by reversing the operations performed on all of the segments of the plain-text message (220).

Example of Deciphering

After creating the modified key based on the existing key exactly the way it was made to be used at the last operation of XOR, this key is applied on the cipher text and by this, a cipher text is regenerated in its state when it was only affected by shifting and relocating the bits. Then, the encrypted block is decrypted by counting the number of ones in the key. For the 11 bits of number one (106) in the key (105) shown in FIG. 1, the first 11 bits of the ciphered text are skipped. From the 12th bit in the cipher text, we take one bit from the 13th bit if the first bit of key is zero (310) or we take the 1st bit of cipher text if the 1st bit of the key (105) is one (106). The same happens for the second bit of the key (105). Assume that the first bit of the key is one, we take the $13^{th}$ bit of cipher text if the second bit of key is zero and we take the second bit of the cipher text if the second bit of the key is one. So we slide on the tapped bits (which are from $1^{st}$ bit to $11^{th}$ bit) and at the same time we inspect the remaining bits (from $12^{th}$ bit on). The plain-text is generated bit by bit by toggling between tapped bits and remaining bits. If the $n^{th}$ bit of key is one, we put $n^{th}$ bit of the plain-text from the tapped bits and if the $n^{th}$ bit of key is zero we take one bit from remaining bits. We move on tapped bits and remaining bits not to use any bit twice.

Further protections are available by ciphering the key to make a ciphered-extract key. Thus, the first computing device (200) may utilize the processor (210) that is further configured to create a ciphered-extract key by changing the key (105) with one or more reversible operations. As examples, such reversible operations may include one or more of altering the bytes of the key (105) by setting to one (106) the middle bit of each three consecutive zeros, and setting to zero (310) the middle bit of each three consecutive ones. Such newly created key will be unique for both encrypting and decrypting agents and both of parties will XOR their data by it. The encrypting agent will XOR the result of shift-relocation by this key before delivery and the decrypting agent XOR the input first before sticking into shift-relocation.

Further protections are available by ciphering the ciphered first segment (115) using an extract key with a simple process such as XOR. This first computing device (200) may utilize the processor (210) that is further configured to use an extract key to XOR the ciphered first segment (115).

An extract key is generated from the original key by predictable operations. One simple example is to set a one in the middle of each three consecutive zeros and setting to zero the middle bit of each three consecutive ones. The extract key will be used to XOR the cipher text. This last operation is important in critical situations when the information hiding is extremely required.

In a second preferred embodiment of the first computing device (200) for message privacy, the rightward and end shifts are performed in sub-block units within the corresponding block (425) of the first segment (110) and the new block (112), respectively. The differences in second preferred embodiment over the first preferred embodiment are illustrated primarily with reference to FIG. 7. This second preferred embodiment may be referred to as cipher block chaining.

In this second preferred embodiment, the first computing device (200) for message privacy includes the same structure as discussed above for the first preferred embodiment. It includes a non-transitory computer readable medium (205) and a processor (210) coupled to the non-transitory computer readable medium (205).

Figure 7:
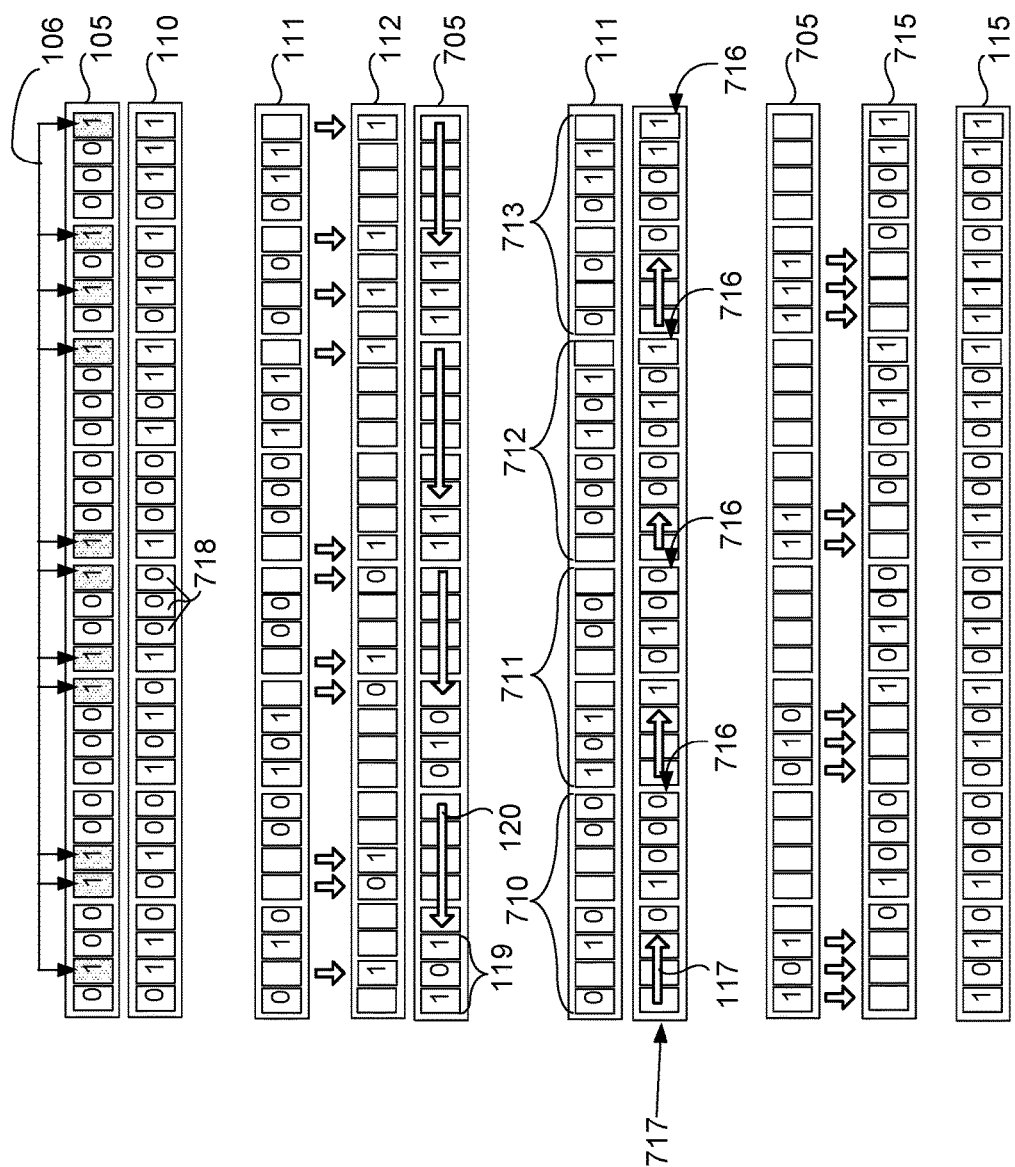
FIG. 7 illustrates operational steps employed on binary code in a fourth preferred embodiment of the instrumentation privacy apparatus and method.

The processor (210) is similarly configured to: access a plain-text message (220) in binary computer code; utilize a key (105) of plain text comprising a block (325), where the block (325) is divided into a plurality of sub-block units, where each sub-block unit comprises at least one byte, and each byte includes a plurality of bits (320) and each bit is a number that is either a zero (310) or a one (106), the plurality of bits (320) defined as a bit length, the plurality of bits (320) comprises a plurality of ones. The sub-block units may for example have a bit-length of 8 bits, 4 bits or even 2 bits. Making the sub-block bit lengths shorter, makes the algorithm useful in stream ciphering. FIG. 7 shows the remaining bits (111) in the corresponding plurality of sub-block units of the first segment (110) of the plain-text message (220), each of these sub-blocks, to wit, sub-block unit A (710), sub-block unit B (711), sub-block unit C (712) and sub-block unit D (713) has locations for eight bits.

In this second preferred embodiment, the processor (210) is configured to align a first segment (110) of the plain-text message (220) with the key (105). When short bit-length sub-blocks are used, it is preferable to avoid using a weak key with a small number of ones so that it is not a trivial matter to decrypt the message.

The second preferred embodiment is somewhat different from the first preferred embodiment in the defined subdivisions within the corresponding block (425). In the second preferred embodiment the first segment (110) is defined by a corresponding block (425), a corresponding plurality of sub-block units, which is illustrated in FIG. 7 as sub-block unit A (710), sub-block unit B (711), sub-block unit C (712) and sub-block unit D (713). The first segment (110) is further defined by a corresponding plurality of bits (718) and corresponding bit length of the key (105), wherein each bit in the plurality of bits (320) in the key (105) vertically aligns with each bit in the corresponding plurality of bits (718) in the first segment (110).

Similarly to the first preferred embodiment, in this second preferred embodiment, the processor (210) is configured to utilize each of the plurality of bits (320) of the key (105) that is one (106) to point to a tapped bit (121) within the corresponding plurality of bits (718) in the first segment (110) of the plain-text message (220).

Similarly to the first preferred embodiment, in this second preferred embodiment, the processor (210) is configured to remove each tapped bit (121) from the first segment (110) of the plain-text message (220), leaving an empty bit space (116) in the block (325) of the first segment (110) of the plain-text message (220) where each tapped bit (121) was removed, and where the first segment (110) of the plain-text message (220) then comprises remaining bits (111).

Similarly to the first preferred embodiment, in this second preferred embodiment, the processor (210) is configured to place each tapped bit (121) into a new block (112) at a corresponding bit location within the new block (112), said new block (112) structured similarly to the key (105).

Unlike the first preferred embodiment, in this second preferred embodiment, the processor (210) is configured to shift the remaining bits (111) in the first segment (110) of the plain-text message (220) rightward (117) within each sub-block unit in the corresponding plurality of sub-block units. These sub-block units are designated as sub-block unit A (710), sub-block unit B (711), sub-block unit C (712) and sub-block unit D (713) in FIG. 7. The shift or movement rightward (117) eliminates each empty bit space (116) between the remaining bits (111) in each said sub-block unit, and positions all the remaining bits (111) in the first segment (110), one next to the other from a sub-block right-end (716) of each said sub-block unit in the corresponding plurality of sub-block units. This shift leaves empty bit spaces on a sub-block left-side (717) of each said sub-block unit in the corresponding plurality of sub-blocks units in the first segment (110).

Unlike the first preferred embodiment, in this second preferred embodiment, the processor (210) is configured to shift each tapped bit (121) in the new block (112) to the end (118) (either a left or a right end) of each sub-block unit of the new block (112) creating an end sequence (119) within each sub-block unit of tapped bits that are one next to the other from the sub-block left-side (717) of each sub-block unit of the new block (112).

Unlike the first preferred embodiment, in this second preferred embodiment, the processor (210) is configured to create a ciphered first segment (115) by inserting the end sequence (119) within each sub-block unit of the new block (112) into the sub-block left-side (717) of each sub-block unit in the corresponding plurality of sub-block units in the first segment (110) of the plain-text message (220), filling each empty bit space (116) of each of said sub-block unit.

Example of Cipher Block Chaining

In this example, the cipher block chaining implements a small stepwise difference with the way cipher is performed to create the ciphered block. FIG. 6 illustrates and shows that the tapped bits are moved to the same length space at the beginning of the next block of the message text. Since the key (105) is identical for both blocks, the bit length of empty space at the left side of all shifted blocks is the same (11 bits in the example). The tapped bits of the first segment may travel to third, fourth or following blocks and not necessarily stop in the second segment. This raises the possibility that if a tapped bit has been changed due to a transmission error, it may belong to one of the previous blocks and the current block might be safe.

Thus, error propagation is a potential problem in cipher block chaining. It is possible to move a bit from a block to the next, but this may cause the bit go further to next and next blocks. The cipher block chaining method disclosed herein may be considered to have two inherent drawbacks. First, it might not be possible to decrypt the received encrypted data before receiving all (or some) next blocks. Second, if an error occurs the effect will adversely affect one of the following blocks.

To overcome these drawbacks, a lengthier bit-length block (say seven times the block size) is used in which the tapped bits of the last block come back into the first block. The lengthier bit-length block is the error termination block. This method is useful to protect the data packets. If the error termination bit-length block size is set equal to maximum transmission unit (MTU) of the network protocol, then each and every datagram will have all its necessary selected bits in itself and the VPN protocol or other network security tool can easily decrypt the packet without any need to receive the next datagrams. The process of using an error termination block is preferably called Cyclic Cipher Block Chaining. Cyclic Cipher Block Chaining is described as chaining the last block of error termination block to the first block again in the same error termination block.

An embodiment of the invention may be described as a method of using a cipher for a device. In this embodiment, the device is the first computing device (200), described above for the apparatus embodiments. The method includes the steps for which the processor (210) is configured in the apparatus embodiments.

The method includes a step of accessing a plain-text message (220) in binary computer code; utilizing a key (105) of plain text comprising a block (325), where the block (325) is divided into a plurality of bytes, shown in FIG. 3 as byte A (305), byte B (306), byte C (307) and byte D (308). Each byte includes a plurality of bits (320) and each bit is a number that is either a zero (310) or a one (106), the plurality of bits (320) defined as a bit length, the plurality of bits (320) comprises a plurality of ones.

The method includes a step of aligning a first segment (110) of a plain-text message (220) sought to be encrypted with the key (105), the first segment (110) defined by a corresponding block (425) matching the bit length of the key (105), wherein each bit of the key (105) vertically aligns with each bit in the first segment (110).

The method includes a step of utilizing each of the plurality of bits (320) of the key (105) that is one (106) aligns with a tapped bit (121) in the first segment (110) of the plain-text message (220).

The method includes a step of removing each tapped bit (121) from the first segment (110) of the plain-text message (220). The removal of each tapped bit (121) leaves an empty bit space (116) in the block (325) of the first segment (110) of the plain-text message (220) where each tapped bit (121) was removed. The removal of each tapped bit (121) effectively results in the first segment (110) of the plain-text message (220) then comprising remaining bits (111).

The method includes a step of placing each tapped bit (121) into a new block (112) at a corresponding bit location within the new block (112). The new block (112) is structured similarly to the key (105).

The method includes a step of shifting the remaining bits (111) in the first segment (110) of the plain-text message (220) rightward (117) so as to eliminate each empty bit space (116) between the remaining bits (111) in the first segment (110) of the plain-text message (220). This shifting positions all the remaining bits (111) in the first segment (110), one next to the other from a right-end (421) of the first segment (110), leaving empty bit spaces on a left-side (107) of the first segment (110).

The method includes a step of shifting each tapped bit (121) in the new block (112) to an end (118) of the new block (112), creating an end sequence (119) of removed tapped bits that are one next to the other from the end (118) of the new block (112).

The method includes a step of creating a ciphered first segment (115) by inserting the end sequence (119) of the new block (112) into a location selected from the group consisting of: the left-side of the first segment (110) filling the empty bit spaces of the first segment (110) of the plain-text message (220); a second block (505) at the right-end (421) of the first segment (110) of the plain-text message (220) thereby creating an augmented first segment (510); and a second block (505) at a beginning (611) of a second segment (130) of the plain-text message (220) displacing second right-end bits (615) located at the right-end of the second segment (130) and then move the bits displaced to the left-side (107) of the first segment (110), filling the empty bit spaces of the first segment (110) of the plain-text message (220).

The method includes a step of configuring the first computing device (200) to send at least the ciphered first segment to a second computing device.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the communication industry.

What is claimed is:

1. A first computing device for improving the utility and performance of computer technology in interacting with a second computing device by enabling conveyance of a secure message from the first computing device to the second computing device, the first computing device comprising:

a non-transitory computer readable medium;
a processor coupled to the non-transitory computer readable medium, the processor in combination with the non-transitory computer readable medium configured to:
  access a plain-text message in binary computer code;
  utilize a key of plain text comprising a block, where the block is divided into a plurality of bytes, and each byte includes a plurality of bits and each bit is a number that is either a zero or a one, the plurality of bits defined as a bit length, the plurality of bits comprises a plurality of ones;
  align a first segment of the plain-text message with the key, the first segment defined by a corresponding block matching the bit length of the key, wherein each bit of the key vertically aligns with each bit in the first segment;
  utilize each of the plurality of bits of the key that is "one" to point to a tapped bit in the first segment of the plain-text message;

remove each tapped bit from the first segment of the plain-text message, leaving an empty bit space in the block of the first segment of the plain-text message where each tapped bit was removed, and wherein the first segment of the plain-text message then comprises remaining bits;

place each tapped bit into a new block at a corresponding bit location within the new block, said new block structured similarly to the key;

shift the remaining bits in the first segment of the plain-text message rightward or leftward so as to eliminate each empty bit space between the remaining bits in the first segment of the plain-text message and so as to position all the remaining bits in the first segment, one next to the other from a right-end or a left-end of the first segment, leaving empty bit spaces on a left-side or a right-side of the first segment;

shift each tapped bit in the new block to an end of the new block creating an end sequence of tapped bits that are one next to the other from the end of the new block;

create a ciphered first segment by inserting the end sequence of the new block into a location selected from the group consisting of:

the left-side or the right-side of the first segment filling the empty bit spaces of the first segment of the plain-text message;

a second block after the right-end of the first segment of the plain-text message thereby creating an augmented first segment; and a supplemental block at a beginning of a second segment of the plain-text message displacing second right-hand bits located at a right block-end of the second segment and then move the second right-hand bits displaced to the left-side of the first segment, filling the empty bit spaces of the first segment of the plain-text message;

create a ciphered-extract key by changing the key with one or more reversible operations, the one or more reversible operations is selected from a group consisting of altering the bytes of the key by setting to one a middle bit of each three consecutive zeros, and setting to zero the middle bit of each three consecutive ones; and the first computing device configured to send at least the ciphered first segment to the second computing device.

2. The first computing device of claim 1, wherein the processor is further configured to use an extract key to XOR the ciphered first segment.

* * * * *